United States Patent [19]

Chen

[11] Patent Number: 5,321,516
[45] Date of Patent: Jun. 14, 1994

[54] TIE ARRANGEMENT FOR SECURING A CATHODE RAY TUBE BOARD ONTO A CATHODE RAY TUBE NECK

[76] Inventor: Su Y. C. Chen, No. 25, Ya Tan Rd., Ta Ya Hsiang, Taichung Hsien, Taiwan

[21] Appl. No.: 81,702

[22] Filed: Jun. 25, 1993

[51] Int. Cl.⁵ .............................................. H04N 5/645
[52] U.S. Cl. .................................... 348/825; 313/440
[58] Field of Search ............... 313/482, 440; 248/917, 248/918, 919, 920, 921, 922, 923; 358/248, 249, 229, 254; 24/16 PB, 16 R, 17 A, 17 B, 17 AP, 19, 20 R, 21

[56] References Cited

U.S. PATENT DOCUMENTS

| | | | |
|---|---|---|---|
| 2,563,525 | 8/1951 | Foster | 313/440 |
| 2,840,740 | 6/1958 | Bickford | 358/248 |
| 4,590,540 | 5/1986 | Nicholson | 358/254 |
| 4,646,159 | 2/1987 | Beaumont | 358/254 |
| 4,810,078 | 3/1989 | Armstrong | 358/229 |

FOREIGN PATENT DOCUMENTS

| | | | |
|---|---|---|---|
| 0295741 | 12/1988 | European Pat. Off. | H01J 29/82 |
| 55-91544A | 7/1980 | Japan | 313/482 |

Primary Examiner—Edward L. Coles, Sr.
Assistant Examiner—Jerome Grant, II

[57] ABSTRACT

A tie arrangement for securing the CRT board onto the CRT neck, includes a belt for tying to the CRT neck, at least two bridge members each having one end coupled to the belt and the other end passed through the corresponding holes on the CRT board and engaged with the corresponding stop buckles on the other side of the hole. Each stop buckle is provided with a hole for the bridge member to pass through and a tongue is formed in the hole for detachably engaging with the bridge member.

4 Claims, 5 Drawing Sheets

TIE ARRANGEMENT FOR SECURING A CATHODE RAY TUBE BOARD ONTO A CATHODE RAY TUBE NECK

BACKGROUND OF THE INVENTION

The present invention relates to a tie arrangement, and particularly to a tie arrangement for securing the cathode ray tube (CRT) circuit board onto the CRT neck.

Apparatus such as televisions, monitors and oscilloscopes needs a displaying device, i.e., CRT to demonstrate the desired result on the screen. Referring to FIG. 6, a conventional CRT 10 and a CRT board 62 are shown, wherein the CRT board 62 is to be secured onto the CRT cap 61 having a plurality of interconnecting pins 611 on the CRT cap 61 to provide the electrical connection with the CRT board 62, which has a socket 64 to receive all the interconnecting pins 611 on the CRT cap 61. However, such an insertion interconnection between the CRT cap 61 and the CRT board 62 is poor and is confined to a very small connecting area, thus the maintainer might loosen this connection unconsciously. Furthermore, due to the fragility of the glass CRT neck and said small connecting area, cracks may occur in the CRT neck.

Another type of such an interconnection between the CRT cap and the CRT board is to add an adhesive on the circumference of the contact area thereof. However, such a connection still fails to overcome the problem of said small connecting area. Thus, an alternative interconnecting device is needed to provide a larger connecting area as to secure the CRT board onto the CRT cap and overcome said problem.

SUMMARY OF THE INVENTION

An object of the present invention is to provide a tie arrangement which permits the CRT board to be secured on the CRT cap and increases the connecting area between the CRT cap and the CRT board.

Another object of the present invention is to provide a tie arrangement to allow a user to readily fix the CRT board onto the CRT neck and detach the CRT board from the CRT.

According to the present invention, a tie arrangement includes a belt forming a circumference tied to the CRT neck, a plurality of bridge members having a first end equally spaced and secured to said circumference of the belt and a plurality of corresponding stop buckles provided on the opposite surface of the CRT board and detachably coupled to a second end of each bridge member as to secure the CRT board onto the CRT neck.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
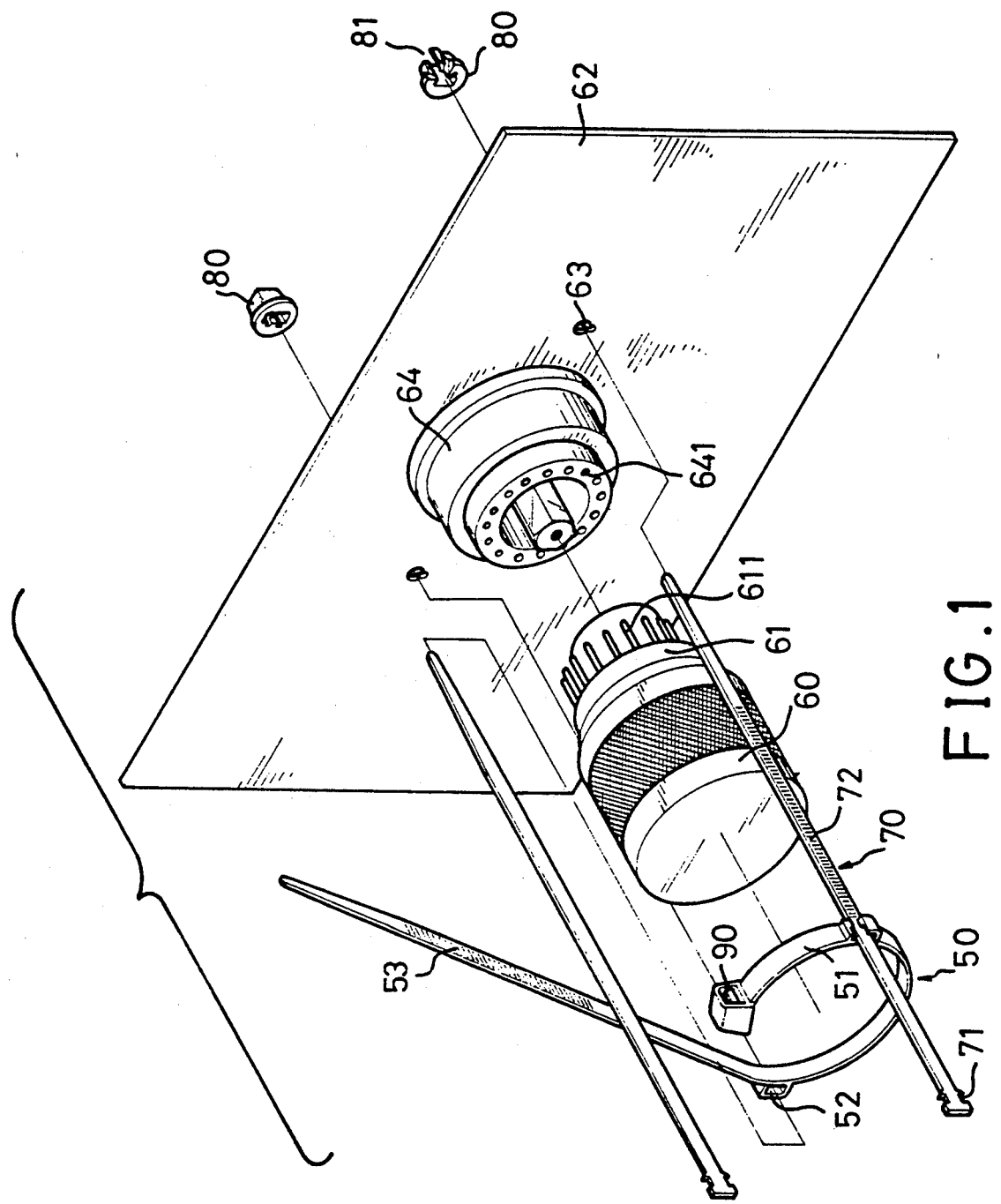
FIG. 1 is a perspective exploded view of an embodiment of the tie arrangement of the present invention.

Referring to FIG. 1, there is shown a perspective view of a tie arrangement in accordance with the present invention. As shown in the drawing, a socket 64 is provided on the surface of the CRT board 62 as to receive the corresponding interconnecting pins 611 on the CRT cap 61, two holes are provided on the CRT board 62, and a tie 50 in accordance with the present invention generally includes a belt 51 having a buckle 90 in a first end of the belt 51 for receiving the other end of the belt 51 having saw-toothed surface 53, as to tie the CRT neck 60, two catches 52 integrally formed on the belt 51 in a diametrically opposite position when the belt 51 is fitted to the shaft of the CRT neck 60, two bridge members 70 each having a snapping member 71 in a first end and a saw-toothed surface 72 extending from a general mediate portion to a second end, and two stop buckles 80 abutting against the opposite surface of the CRT board 62 as to engage with the saw-toothed surfaces 72 of bridge member 70 passing through the holes 63 of the CRT board 62. The snapping member 71 provided on each bridge member 70 is used to fit to the catch 52 on the belt 51 and the saw-toothed surface 72 provided on a predetermined portion of each bridge members 70 is used to engage with the stop buckle 80.

Figure 2:
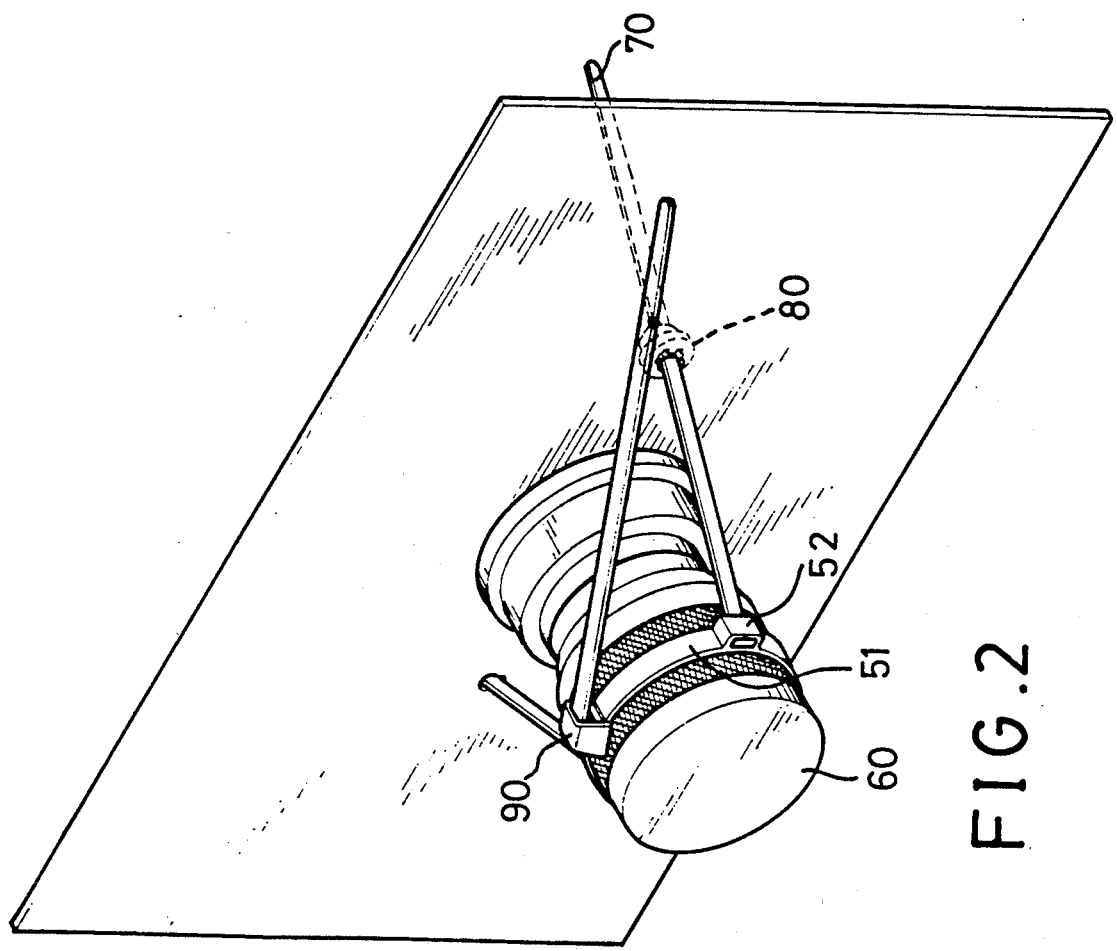
FIG. 2 is a view of the tie arrangement of FIG. 1 in an assembled state, wherein the CRT interconnecting pins are inserted into the socket of the CRT board.

As shown in FIG. 2, the tie arrangement in accordance with this invention is shown in an assembled status, wherein the saw-toothed surface 53 of the belt 51 has engaged with the buckle 90 of the belt 51 and is tied to the CRT neck 60. The snapping member 71 of each bridge member 70 is engaged with a corresponding catch 52 on the belt 51. The saw-toothed surface 72 of each bridge member 70 passes through a corresponding hole 63 on the CRT board 62 and engages with a stop buckle 80 against the opposite surface of the CRT board 62.

Figure 3:
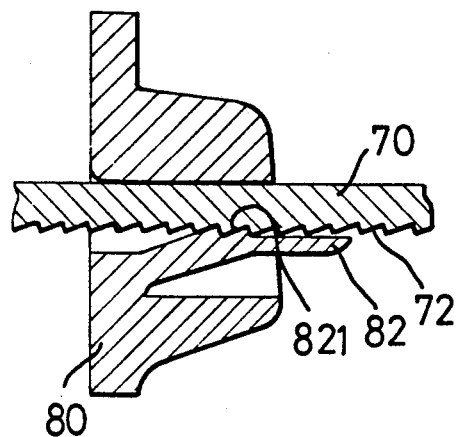
FIG. 3 is a cross-sectional view showing a stop buckle in combination with the bridge member.
Figure 4:
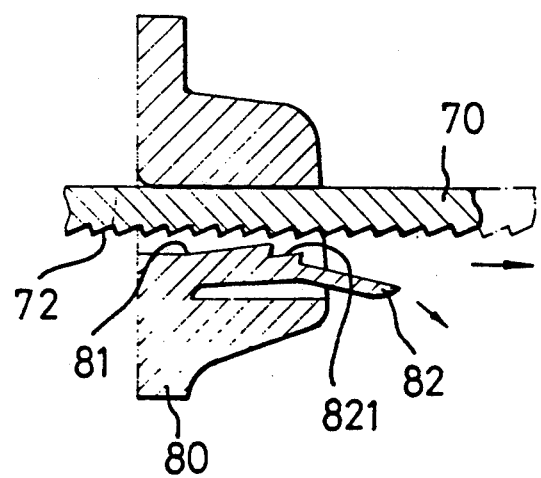
FIG. 4 is a cross-sectional view showing a bridge member is released by the stop buckle.

FIGS. 3 and 4 show the detailed cross-sectional view of the stop buckle 80 in accordance with the present invention. FIG. 3 shows the stop buckle 80 being engaged with the saw-toothed surface 72 of the bridge member 70. A hole 81 is provided in the stop buckle 80 for the saw-toothed surface 72 of the bridge member 70 to pass through, wherein a tongue 82 having a ratchet portion 821 is provided in the hole 81 and protrudes from the inner of the hole 81 to the outer of the hole 81 for freely moving the tongue 82 within the hole 81. As shown in FIG. 3, the saw-toothed surface 72 of the bridge member 70 is engaged with the ratchet portion 821 on the tongue 82. Thus the bridge members are tightly secured to the stop buckles 80, thereby the CRT neck 60 and the CRT board 62 are fixed. As shown in FIG. 4, the bridge member 70 is released by pulling the tongue 82 downwardly. Thus, the ratchet portion 821 is disengaged from the saw-toothed surface of the bridge members 70 and the CRT board 62 may be easily detached from the CRT neck 60.

Figure 5:
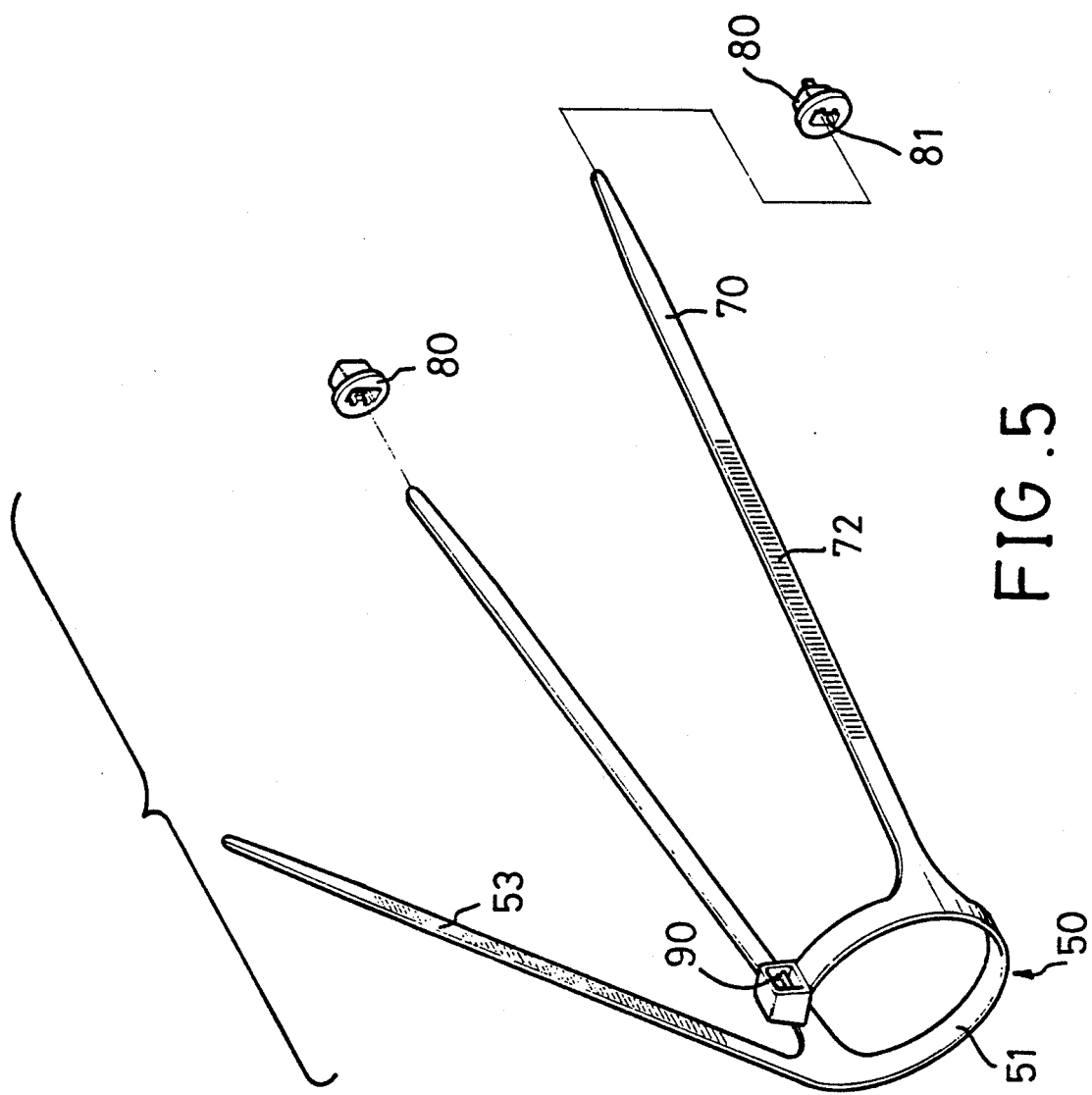
FIG. 5 is a perspective exploded view of the tie arrangement in accordance with another embodiment of the invention.
Figure 6:
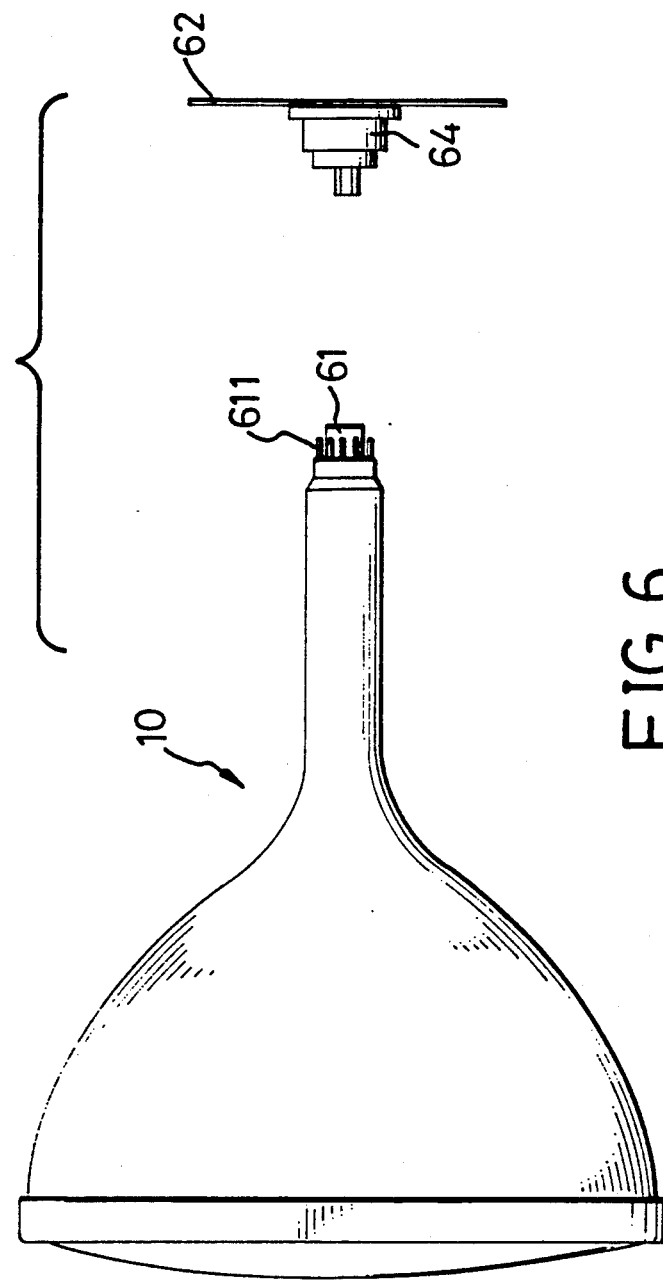
FIG. 6 is a side view illustrating the conventional connection between the cathode ray tube and the cathode ray tube board.

FIG. 5 shows an alternative embodiment of this invention, wherein the bridge members 70 are integrally formed with the belt 51, this will not need additional catches 52 to be formed on the belt 51 and offers an easy assembling and manufacturing of this tie arrangement.

Although the invention has been explained in relation to its preferred embodiment, it is to be understood that many other possible modifications and variations can be made without departing from the spirit and scope of the invention as hereinafter claimed.

I claim:

1. A tie arrangement for securing a cathode ray tube board onto a cathode ray tube neck comprising:

a belt means having a first end provided with a buckle and a second end provided with a saw-toothed surface extending from said second end to the general mediate portion thereof, said second end passing through the buckle of said first end to form a circumference portion firmly enclosing the cathode ray tube neck;

at least two bridge members each having a first end connected to said circumference portion of said belt means in an equally spaced position;

at least two holes being respectively provided on the cathode ray tube board for the second ends of said bridge members to pass through; and at least two stop buckles each having said second end of said bridge member passed through and abutted against the cathode ray tube board.

2. A tie arrangement according to claim 1 wherein each said bridge member has a saw-toothed surface extending from the general mediate portion to the second end thereof and each said stop buckle has a hole with a tongue protruding therefrom, a plurality of ratchets being provided on the tongue mating with said saw-toothed surface of said bridge member for detachably engaging with said saw-toothed surface of said corresponding bridge member.

3. A tie arrangement according to claim 1 wherein said first end of said bridge member have a snapping member and the belt has a corresponding catch for firmly engaging said snapping member.

4. A tie arrangement according to claim 1 wherein said belt means and said bridge member are integrally formed.

* * * * *